Aug. 22, 1967   B. G. STAPLES ET AL   3,336,659

METHOD OF MAKING SHIELDED GASKETS

Filed March 1, 1965  2 Sheets-Sheet 1

INVENTORS
BASIL G. STAPLES
HERBERT F. SPIES
BY

ATTORNEY

Aug. 22, 1967  B. G. STAPLES ET AL  3,336,659
METHOD OF MAKING SHIELDED GASKETS
Filed March 1, 1965  2 Sheets-Sheet 2

INVENTORS
BASIL G. STAPLES
HERBERT F. SPIES
BY

ATTORNEY

United States Patent Office 3,336,659
Patented Aug. 22, 1967

3,336,659
METHOD OF MAKING SHIELDED GASKETS
Basil G. Staples, Gates, and Herbert F. Spies, Webster, N.Y., assignors to Ritter Pfaudler Corporation, a corporation of New York
Filed Mar. 1, 1965, Ser. No. 435,940
7 Claims. (Cl. 29—512)

This invention relates to a method of making metal shielded gaskets and more particularly related to gaskets and rings shielded with tantalum and similar corrosion resistant metals.

Shielded gaskets are used in industrial applications where a flexible deformable material is necessary to provide good sealing (such as between irregular surfaces), but where corrosion resistance or other physical and chemical characteristics are also desirable. In such cases, it is common to provide gasket members having a substantial portion of their surface (faces and inner periphery) covered by a metallic shield.

Heretofore, although it was common to use soft metals such as copper or lead to shield gaskets, harder metals such as tantalum were not widely used for such applications because of the difficulty and expensiveness of forming and welding such materials.

It is the primary object of this invention to provide a method of making shielded rings or gaskets that are easily fabricated and yet are inexpensive relative to comparable and presently available shielded members.

A prior art method for fabricating shielded gaskets comprised the formation of two washer like members, welding the inner peripheries of said members together and then sandwiching gasket material between said washer members. Thus, every shield required a welded joint around the entire inner circumference of the shield. Further, since the gasket material often was not as heat resistant as the shield, the composite unit could not be formed in a single operation, as the necessary welding of the shield might damage or destroy the gasket material. Accordingly, it is an object of this invention to provide a method for fabricating a shielded gasket wherein the shield is not formed by welding or heat treatment and thus the composite unit may be formed with the gasket material in situ.

In the fabrication of metal members having flared end portions a shaping method known as "spinning" has been used. In spinning processes a stationary tool is positioned in engagement with an internal surface of a rotating workpiece and force is applied in a manner designed to form the metal of the rotating workpiece into a predetermined shape. It is an object of this invention to provide shielded rings or gaskets wherein "spinning" techniques are used to form the shields in situ.

In the forming or shaping of metal members, where the inner member, for instance a gasket, is formed of a relatively hard material, it is possible to use the inner member as a die or at least as a rigid retainer to aid in the forming operations. However, where the inner membrane is formed of a relatively soft material, it cannot be used as a backing material and accordingly, such forming techniques are inapplicable to such materials. It is another object of this invention to provide a method for forming shielded members that is equally applicable whether the inner member is rigid or deformable.

In the application of "spinning" techniques to a small item, such as a shield for a gasket or ring having a relatively small thickness, a major problem is presented. In contrast to larger and sturdier materials, the very nature of the article makes it difficult to hold the article in position while applying the substantial forces necessary for the spinning operations. We have found that shielded rings or gaskets of excellent quality may be quickly, inexpensively and easily formed by the following procedure:

(a) providing a cylindrical tubular member formed from the shielding material;
(b) forming a circumferential depressed portion or groove on the surface of said tubular member at a point between the ends of said tubular member;
(c) positioning a gasket within said groove and radially surrounding said tubing; and
(d) spinning the ends of said tubing until they extend radially outward in a manner to form a shield that partially or completely covers the faces of said gasket;

whereby a composite article comprising a gasket having its internal circumference and all or a portion of its faces covered by the shielding material is formed.

The manufacture of shielded gaskets in accordance with the invention provides heretofore unavailable and superior articles. The expensive and time consuming welding processes previously used are rendered obsolete by this method. The articles provided, because of the unitary nature of the shielding portion, have a surface appearance that enhances their attractiveness to potential users and yet does not require extensive polishing and finishing. In addition to the aesthetic values provided, the absence of welds provides a material of uniform strength and eliminates a source of potential failure or corrosion. Thus, we have achieved a unique combination of aesthetic attractiveness, increased strength, ease of fabrication and economic feasibility.

A complete understanding of the invention may be obtained from the following description and explanation which refer to the accompanying drawings illustrating a preferred embodiment.

Figure 1:
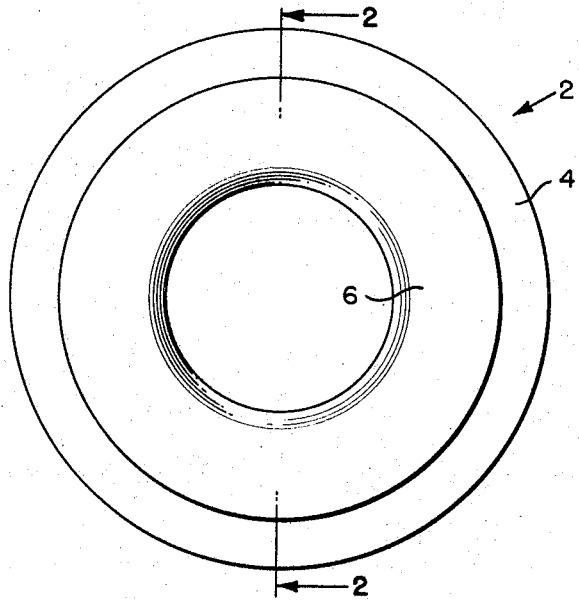
FIG. 1 is a top plan view of a shielded gasket according to the present invention.
Figure 2:
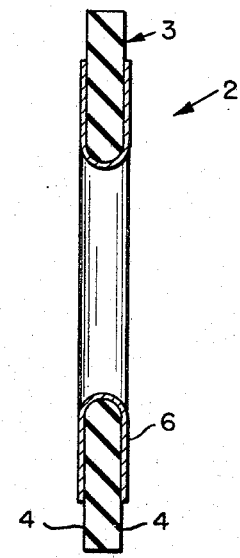
FIG. 2 is a sectional view taken along the lines 2—2 of FIG. 1.

Referring now to the drawings, FIG. 1 and FIG. 2 show a composite annular shielded gasket generally designated at 2 comprising a gasket 3 having its inner periphery and portions of gasket faces 4 covered by a unitary gasket shield 6 that extends in an uninterrupted fashion from one gasket face to the other gasket face.

Shielded gasket 2 as shown in FIG. 1 and FIG. 2 is indistinguishable in appearance from a conventional gasket having a shield formed of a soft metal, but is novel per se because of the fact that it is spun from a single continuous section of tantalum.

Figure 3:
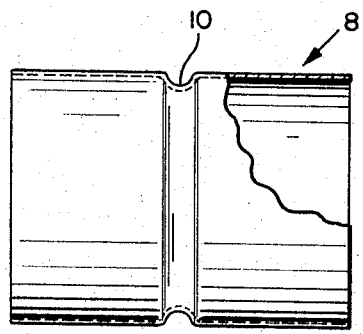
FIG. 3 shows the shielding material in its cylindrical form prior to the spinning operation and having a groove formed therein.

FIG. 3 shows a tubular cylindrical member 8 having a circumferential groove 10 positioned at a point between the ends.

Figure 4:
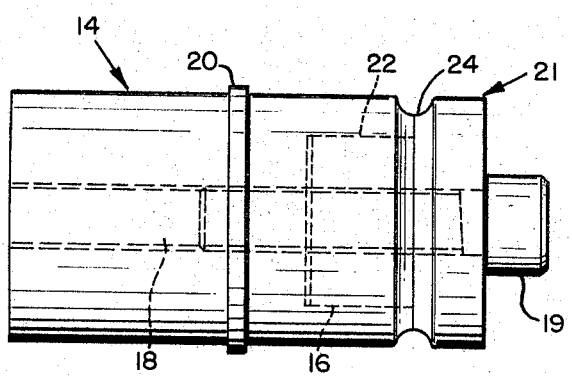
FIG. 4 shows the holding tool used in the fabrication of shielded gaskets according to the invention, said tool having a rolling adapter positioned therein.

Referring to FIG. 4, a cylindrical holding tool, generally designated at 14, having a main bore 16 and a smaller concentrically tapped passage 18 adapted for the receipt of a bolt 19 or other securing means is shown. A radial ridge 20 is provided on the outside of holding tool 14 and forms a seat that limits axial movement of tubing when in position. A rolling adapter 21 with a neck 22 adapted for the receipt of bolt 19 and for fitting within the bore 16 of tool 14 is provided. Adapter 21 and holding tool 14 have arcuate end portions adapted to form a concave hemispherical groove 24 when they abut.

Figure 5:
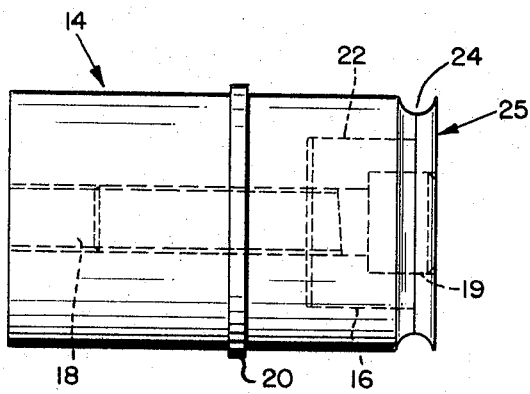
FIG. 5 shows the holding tool with the spinning adapter positioned therein.

In FIGURE 5 spinning adapter 25 has been substituted for rolling adapter 21 within holding tube 14. Spinning adapter 25 is adapted to fit into main bore 16 of holding tool 14 and has an arcuate end portion adapted to form groove 24 when it abuts holding tool 14. It should be noted that spinning adapter 25 has an annular void therein terminating in a passage that is alignable with passage 18 of holding tube 14. This void is sufficiently large to permit the head of bolt 19 to be positioned therein so that it does not extend past the outer force of spinning adapter 25.

Figure 6:
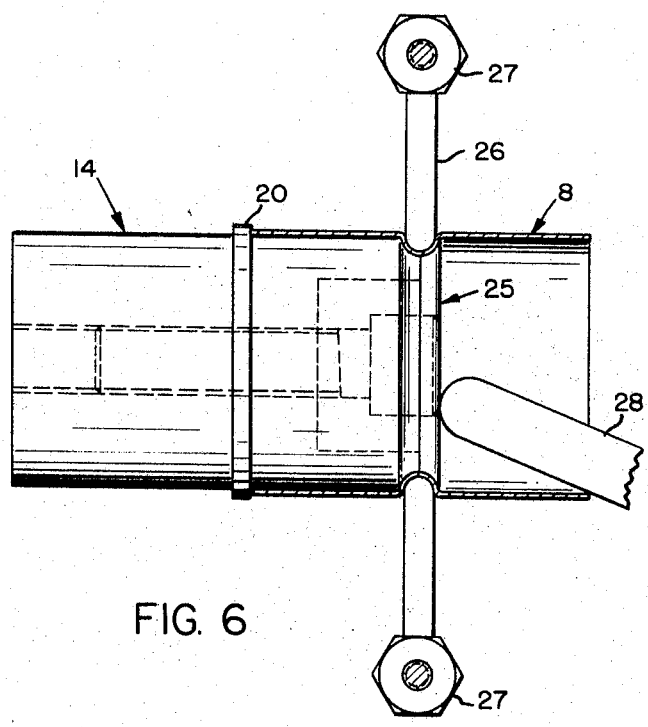
FIG. 6 is a side elevational view of a tube with tools in position for the spinning operation.

FIG. 6 shows holding tool 14 surrounded by an annular backing plate 26 that is positioned within groove 24. Backing plate 26 is provided with locking means 27 that permits its assembly and disassembly within groove 24 without removing the workpiece. Tube 8 is shown in position over spinning adapter 25 and spinning tool 28 is shown inserted within tube 8.

Figure 7:
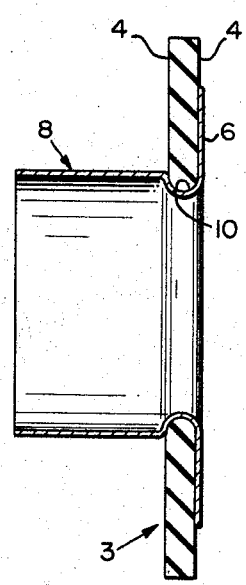
FIG. 7 shows the composite shielded gasket in a semi-finished condition.

In preparing a shielded gasket according to the invention, a section of tubing having a suitable length and thickness is positioned upon holding tool 14 by inserting holding tool 14 concentrically within the tubing. Rolling adapter 21 is attached to holding tool 14 and circumferential groove 10 is formed. After the formation of groove 10, rolling adapter 21 is removed and a separable backing plate 26 shown in position in FIG. 6 is positioned within groove 10. Spinning adapter 25 is attached and a radially extending shield face 6 is spun out by using spinning tool 28 shown in position in FIG. 6 to provide a semi-finished article as shown in FIG. 7.

After formation of the first shield face 6, tube 8 is reversed and the opposite end is inserted upon holding tool 14. The gasket 3 is then assembled over the unfinished end and positioned within groove 10. The second shield face is then spun in the same manner as described above. The backing plates are then removed and the shield faces are pressed flat thereby completing the operation.

In the formation of shielded gaskets according to the method of this invention savings of up to 80% of the expense attributable to labor and material are realized. The rejections formerly caused by improper welds are totally eliminated and an improved product is provided.

Although we have described the invention by an embodiment wherein a tantalum shield is formed, the invention is not limited thereto but is also operative with other metals such as lead, aluminum, tin, stainless steel, silver, etc.

This invention is useful wherever metal sheathing or cladding is required for the faces and inside periphery of a ring component. Accordingly, spacers and rings as well as gaskets are within the scope of our invention.

It is apparent that the invention has achieved its stated objects by providing a novel shielded gasket wherein said shield is spun-formed from a single unitary portion of metal. Further, this invention provides a method for fabricating said novel objects that is inexpensive and simple when compared with prior art methods. In addition, this method is useful whether the material to be shielded is deformable or non-deformable and permits formation of the shield with the inner material in situ without regard to its heat-resistance characteristics.

It is to be understood that the described embodiment is preferred, but is intended to be illustrative rather than limiting. Various modifications and changes may be made without departing from the spirit or scope of the invention as set forth in the appended claims.

We claim:
1. A method of making a unitary gasket shield comprising the following steps:
   (a) forming a circumferential groove in a tube at a point between the ends thereof; and
   (b) spinning the ends of said tube until they extend radially outwardly from said tube substantially perpendicular from and adjacent to said groove;
whereby a gasket shield having a continuous smooth curved surface is formed.

2. A method of making a unitary gasket shield comprising the following steps:
   (a) forming a circumferential groove in a tube at a point between the ends thereof;
   (b) holding said tube by said circumferential groove; and
   (c) spinning the ends of said tube until they extend radially outwardly from said tube substantially perpendicular from and adjacent to said groove.
whereby a gasket shield having a continuous smooth curved surface is formed.

3. A method of making a shielded gasket comprising the following steps:
   (a) forming a circumferential groove in a cylindrical tube at a point between the ends thereof;
      (1) the width of said groove being substantially equal to the thickness of a gasket to be shielded;
   (b) positioning a gasket within said circumferential groove;
   (c) spinning the ends of said tube until they extend radially from said tube substantially perpendicular from and adjacent to said groove; and
   (d) pressing the radially extending portions of said tube into tight engagement with said gasket;
whereby a continuous smoothly curved gasket shield closely overlying the surface of said gasket is formed.

4. A method of making a shielded gasket comprising the following steps:
   (a) forming a circumferential groove in a cylindrical tube at a point between the ends thereof;
      (1) the width of said groove being substantially equal to the thickness of a gasket to be shielded;
   (b) positioning a gasket within said circumferential groove;
   (c) holding said tube by said circumferential groove;
   (d) spinning the ends of said tube until they extend radially from said tube substantially perpendicular from and adjacent to said groove; and
   (e) pressing the radially extending portions of said tube into tight engagement with said gasket;
whereby a continuous smoothly curved gasket shield closely overlying the surface of said gasket is formed.

5. A method of making a unitary gasket shield comprising the following steps:
   (a) forming a circumferential groove in a cylindrical tube
      (1) said groove being substantially semi-circular in cross-section; and
      (2) the width of said groove being substantially equal to the thickness of a gasket to be shielded;
   (b) positioning said tube upon a holding tool having a mating groove formed therein, said groove being aligned with the groove within said tube;
   (c) spinning one end of said tube to form a radially extending flange substantially perpendicular to said tube and adjacent to said groove;
   (d) removing said tube from said holding tool;
   (e) slipping a gasket having an inner circumference greater than the circumference of said groove over the other end of said tube;
   (f) positioning said gasket within said groove;
   (g) positioning said tube with said gasket in position upon said holding tool;
   (h) spinning the other end of said tube to form a radially extending flange substantially perpendicular to said tube and adjacent to said groove; and
   (i) pressing the radially extending portions of said tube into tight engagement with said gasket;
whereby a continuous smoothly curved gasket shield closely overlying the surface of said gasket is formed.

6. A method of making a unitary gasket shield comprising the following steps:
   (a) positioning a substantially cylindrical tube on a tool having a circumferential groove in the surface thereof;
   (b) pressing inwardly on said tube where it overlies said tool groove thereby forming a circumferential groove in said tube and forcing said tube into tight engagement with said tool; and
   (c) spinning the ends of said tube until they extend radially outwardly from said tube substantially perpendicular from and adjacent to said tube groove;
   whereby a gasket shield having a continuous smooth curved surface is formed.

7. A method of making a shielded gasket comprising the following steps:
   (a) positioning a substantially cylindrical tube on a tool having a circumferential groove in the surface thereof;
   (b) pressing inwardly on said tube where it overlies said tool groove thereby forming a circumferential groove in said tube and forcing said tube into tight engagement with said tool;
   (c) positioning a gasket within said circumferential groove;
   (d) spinning the ends of said tube until they extend radially from said tube substantially perpendicular from and adjacent to said tube groove; and
   (e) pressing the radially extending portions of said tube into tight engagement with said gasket;
   whereby a continuous smoothly curved gasket shield closely overlying the surface of said gasket is formed.

References Cited
UNITED STATES PATENTS

| | | | |
|---|---|---|---|
| 96,916 | 11/1869 | Hisley | 29—512 |
| 859,317 | 7/1907 | Miller et al. | 72—82 |
| 1,907,038 | 5/1933 | Burns | 72—125 X |
| 1,964,630 | 6/1934 | Hanlan. | |
| 2,155,542 | 4/1939 | Graham. | |
| 2,376,017 | 5/1945 | Swallpiece | 277—235 X |
| 2,410,476 | 11/1946 | Appleton et al. | 72—125 |
| 2,900,315 | 8/1959 | Ohlinger. | |
| 2,956,334 | 10/1960 | Stewart | 29—523 X |
| 3,009,722 | 11/1961 | Augustin | 277—235 X |

CHARLIE T. MOON, *Primary Examiner.*